United States Patent [19]
Uchiyama et al.
[11] Patent Number: 4,661,393
[45] Date of Patent: Apr. 28, 1987

[54] INK COMPOSITIONS AND INK SHEETS FOR USE IN HEAT TRANSFER RECORDING

[75] Inventors: Koji Uchiyama, Kawasaki; Akira Nakazawa, Yokohama; Masao Tanaka, Kawasaki, all of Japan

[73] Assignee: Fujitsu Limited, Kawasaki, Japan

[21] Appl. No.: 783,799

[22] Filed: Oct. 3, 1985

Related U.S. Application Data

[60] Continuation of Ser. No. 666,551, Oct. 30, 1984, abandoned, which is a division of Ser. No. 646,493, Sep. 4, 1984, abandoned, which is a continuation of Ser. No. 363,853, Mar. 31, 1982, abandoned.

[30] Foreign Application Priority Data

Mar. 31, 1981 [JP] Japan .................................. 56-46375

[51] Int. Cl.[4] .................................................. B32B 5/16

[52] U.S. Cl. .................................. 428/200; 106/14.5; 106/30; 106/31; 427/148; 428/323; 428/332

[58] Field of Search .................... 106/14.5, 20, 30, 31; 427/148, 256, 288; 428/323, 200, 332

[56] References Cited

U.S. PATENT DOCUMENTS 3,330,791 7/1967 Mater et al. ................. 400/241.2 X
3,348,651 10/1967 Mater et al. ...................... 400/241.2
3,392,042 7/1968 Findlay et al. ............... 400/241.2 X
3,413,183 11/1968 Findlay et al. .................. 428/914 X
3,413,184 11/1968 Findlay et al. ............... 428/321.3 X
3,744,611 7/1973 Montanari et al. ................. 400/120
3,922,445 11/1975 Mizuno et al. .................. 428/913 X
4,042,401 8/1977 Newman et al. .................. 106/14.5
4,238,549 12/1980 Dapp et al. ....................... 106/31 X
4,253,838 3/1981 Mizuno et al. .................. 428/913 X
4,269,892 5/1981 Shattuck et al. ................ 400/120 X
4,272,292 6/1981 Mizuno et al. ......................... 106/22
4,315,643 2/1982 Tokunaga et al. .............. 428/913 X
4,321,286 3/1982 Scott et al. ...................... 428/914 X
4,367,071 1/1983 Mizuno et al. ...................... 428/341
4,400,100 8/1983 Aviram et al. ...................... 400/120
4,503,095 3/1985 Seto et al. ....................... 428/913 X

FOREIGN PATENT DOCUMENTS 0063000 10/1982 European Pat. Off. ......... 428/321.3
0105579 8/1980 Japan ............................... 428/321.3
0183297 10/1983 Japan ............................... 428/321.3
0208093 12/1983 Japan .................................. 428/914
0091092 5/1984 Japan .................................. 428/914
0165691 9/1984 Japan .................................. 400/120
0165693 9/1984 Japan .................................. 400/120
0040296 3/1985 Japan .................................. 400/120
0040297 3/1985 Japan .................................. 400/120
0063194 4/1985 Japan .................................. 400/120

OTHER PUBLICATIONS

IBM Technical Disclosure bulletin, "Thermal Printer Ribbons", Crooks et al., vol. 18, No. 7, Dec. 1975, pp. 2267–2268.

IBM Technical Disclosure bulletin, "Multi-Pass Thermal Transfer Inks", Anderson et al., vol. 27, No. 3, Aug. 1984, pp. 1788–1789.

*Primary Examiner*—Amelia B. Yarbrough
*Attorney, Agent, or Firm*—Staas & Halsey

[57] ABSTRACT

An improved ink composition is disclosed which comprises, in addition to a solvent dye, one or more low-melting compounds, containing hydroxyl and/or ethylene oxide, and inorganic or organic fine particles. An ink sheet comprising such ink composition is also disclosed. The ink sheet is effectively reusable in a heat transfer recording process.

13 Claims, 2 Drawing Figures

INK COMPOSITIONS AND INK SHEETS FOR USE IN HEAT TRANSFER RECORDING

This is a continuation of co-pending application Ser. No. 666,551 filed on Oct. 30, 1984, now abandoned, which is a divisional application of Ser. No. 646,493 filed Sept. 4, 1984, now abandoned, which itself is a continuation application of Ser. No. 363,853 filed Mar. 31, 1982, now abandoned.

BACKGROUND OF THE INVENTION

The present invention relates to heat transfer recording, and more particularly, to improved ink compositions for heat transfer recording and reusable heat transfer recording ink sheets containing such ink compositions.

As is well-known in the art, the heat transfer recording process is extensively used for various recording purposes. This recording process features both such principal advantages as easy and simple procedures and inexpensiveness as a result for intense of use of plain paper as recording material, and such additional advantages as good retention of the formed recording. Such a recording process can be effectively used in a wide range of image recording fields.

Even the heat transfer recording process, however, has shortcomings. For example, the process has conventionally made use of ink sheets wherein a single transfer recording step transfers all the ink composition from areas of the substrate of the ink sheet corresponding to the recorded pattern to the receiver sheet while ink composition still remains from areas of the substrate of the ink sheet not corresponding to the recorded pattern. The lack of its uniform, overall distribution makes it impossible to use the ink sheet in a succeeding transfer recording step. Therefore, ink sheets of this type must be disposed of after a single use. Such so-called single-use ink sheets are considered expensive to the users.

Recently, methods for the provision of reusable heat transfer recording ink sheets have been proposed. One well-known method provides for the repeated supply of additional ink composition to the ink sheet after each transfer recording step. However, the supply procedure is troublesome since a new ink composition must be continuously and uniformly coated on the substrate of the ink sheet after each transfer recording step. Further, complicated supply devices and related equipment are necessary. Therefore, while this method enables the repeated use of ink sheets, it detracts from the overall advantages of the heat transfer recording process itself.

A more advanced method, known from Japanese Patent Application Laid-Open Gazette No. 55-105579, provides for the ink to be contained in a plurality of pores formed within the polymeric film. The ink may be expressed under pressure. This process utilizes the ability of the pores to retain to enable reuse of ink sheets. However, the formation of a porous resin layer on polymeric film is complicated, and the uniform filling of the ink into the pores of the formed resin layer is difficult.

SUMMARY OF THE INVENTION

An object of this invention is to provide improved ink compositions and ink sheets, for use in heat transfer recording, which are able to withstand repeated use and do not detract from the characteristic advantages of the heat transfer recording process,s such as ease, simplicity, and low cost.

We found that the above object can be attained by adding the following aids to the coloring agents or solvent dyes conventionally used in the preparation of heat transfer recording ink compositions:

(1) one or more low-melting (temperature) compounds having a melting point of 40° to 100° C. and containing hydroxyl and/or ethylene oxide, and (2) inorganic or organic fine powders having a particle size of 0.01 to 200 μm and which are insoluble and dispersible in an organic solvent.

The heat transfer recording ink sheet according to the present invention can be produced by forming a layer of the above-described ink composition on a suitable substrate. In the production of the ink sheet, it is preferred that the surface of the ink composition layer be subjected to a smoothing treatment under the application of a linear pressure of 5 to 20 kg/cm.

As will be described in detail hereinafter, the present invention is based on the findings that (1) the mixture of certain inorganic or organic fine powders, having an excellent agglomeration property for providing an ink composition enables, through the action of the agglomerated fine powders, both a moderate retention of the ink composition within the ink sheet and a small expression in each transfer recording step, and that (2) certain hydroxyl- and/or ethylene oxide-containing low-melting compounds can additionally act as a dye dissolving aid, a sensitizing agent, and a binding agent.

DESCRIPTION OF THE PREFERRED EMBODIMENTS

We will now describe the present invention in detail with reference to the accompanying drawings.

Figure 1:
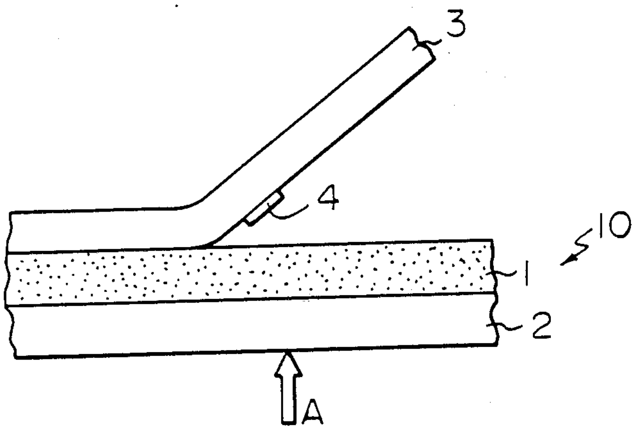
FIG. 1 represents diagrammatically a typical example of a heat transfer recording process using the ink sheet of the present invention.

FIG. 1 shows a heat transfer recording ink sheet 10 of the present invention, in which a layer 1 of the ink composition is coated on one surface of the substrate 2. When heat and pressure are applied to the ink sheet 10 through a thermal printing head (not shown) in the direction of arrow A, the applied heat is transmitted through the substrate 2 to reach the ink composition layer 1, whereby the ink composition distributed therein is melted and expressed therefrom. The expressed ink composition is then transferred to a receiver sheet 3 of plain recording paper to form a transferred recording 4. Thereafter, the receiver sheet 3 is peeled off from the ink sheet 10. Alternatively, pressure may be applied to the ink sheet 10 by means of pressure rollers or any other pressure-applying means positioned behind the receiver sheet 3.

Figure 2:
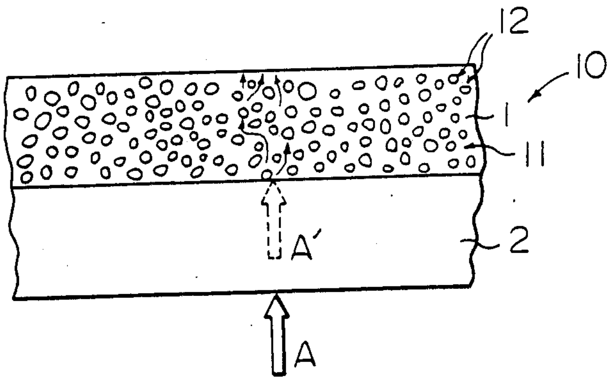
FIG. 2 shows an enlarged cross-sectional view of the ink sheet of the present invention.

FIG. 2 shows a portion of the ink sheet on an enlarged scale showing the process of melting and expression of the ink composition. As shown in FIG. 2, a layer 1 of the ink composition comprises a transfer component (comprising solvent dye and low-melting compounds) 11 having uniformly dispersed therein a filling agent, namely, inorganic or organic fine powders, 12, wherein the transfer component 11 is located in and fills the gaps between the particles of the fine powder. Heat applied to the ink sheet 10 from a thermal printing head (not shown) is transmitted through the substrate 2 for instance along the path of arrow A and arrow A'. In the ink composition layer 1, the transmitted heat melts the transfer component 11 distributed therein and expresses the melted transfer component therefrom. During the process of expression of the melted component, the filling agent 12, also distributed in the ink composition layer 1, acts as a barrier to the melted component, thereby hindering the melted component's smooth expression. The melted transfer component 11 accordingly is expressed from layer 1 as is shown by the small arrows of FIG. 2. This effectively prevents the transfer component from being completely transferred from the ink sheet to the receiver sheet in a single use. Use of the ink sheet of the present invention for the transfer recording process therefore enables both a moderate retention of the transfer component 11 within the ink composition layer 1 and a small consumption of said transfer component during each transfer recording step.

In the production of ink sheets of the present invention, any material may be used as the substrate as long as it can withstand the heat of thermal printing heads or the like. Namely, any conventional material which does not soften, melt, or deform upon heating with said heating means may be used. Preferred materials suitable as the substrate include polyamide film, polyimide film, polyester film, polycarbonate film, and other polymeric films, glassine paper, condenser paper, and other thin paper, and aluminum foil and other meta foils or sheets. Alternatively, the substrate may be a composite comprising two or more adhered layer of said substrate materials. It is generally preferred that the thickness of the substrate be in the rage of 5 to 25 μm.

The layer of ink composition formed on the substrate comprises, as described earlier, a transfer component and a filling agent. The transfer component comprises the coloring agent as a main portion. The coloring agent may be any dye conventionally used in the art and soluble in an organic solvent, namely, a solvent dye. Dyes suitable for the transfer component include anthraquinone dyes such as Sumikalon Violet RS (product of Sumitomo Chemical Co., Ltd.), Dianix Fast Violet 3R-FS (product of Mitsubishi Chemical Industries, Ltd.), and Kayalon Polyol Brilliant Blue N-BGM and KST Black 146 (products of Nippon Kayaku Co., Ltd.); azo dyes such a Kayalon Polyol Brilliant Blue BM, Kayalon Polyol Dark Blue 2BM, and KST Black KR (products of Nippon Kayaku Co., Ltd.), Sumickaron Diazo Black 5G (product of Sumitomo Chemical Co., Ltd.), and Miktazol Black 5GH (product of Mitsui Toatsu Chemicals, Inc.); direct dyes such as Direct Dark Green B (product of Mitsubishi Chemical Industries, Ltd.) and Direct Brown M and Direct Fast Black D (products of Nippon Kayaku Co., Ltd.); acid dyes such as Kayanol Milling Cyanine 5R (product of Nippon Kayaku Co., Ltd.); and basic dyes such as Sumicacryl Blue 6G (product of Sumitomo Chemical Co., Ltd.) and Aizen Malachite Green (product of Hodogaya Chemical Co., Ltd.). Any organic solvent conventionally used as dye solvents may be optionally used to dissolve said solvent dye. Suitable organic solvents include ethyl alcohol, toluene, isopropyl alcohol, and acetone.

In the preparation of ink compositions of the present invention, it is essential to incorporate low-melting compounds having a melting point of 40° C. to 100° C. and containing hydroxyl and/or ethylene oxide into the transfer component. The low-melting compound are used as an aid and are selected from natural resins, polyvalent alcohol compounds, ether compounds, or ester compounds. These low-melting compounds may be used alone or in combination. They have a good affinity to the substrate, to which the ink composition containing said low-melting compounds is coated, not only in a pre-melting solid condition but also in a post-melting fluid or viscous fluid condition.

While the low-melting compounds used in the practice of the present invention have a large affinity to the substrate used, they do not cause adhesion of the ink sheet to the receiver sheet during transfer recording, in other words, they do not display adhesive properties when they are incorporated in the ink composition and the resulting ink sheet is used in the heat recording process.

The term "affinity" as used herein means that the low-melting compounds display adhesive properties with the substrate and, consequently, the ink composition containing the same is not repelled by the substrate.

Preferred low-melting compounds effectively used in the present invention include rosin, carnauba wax, and other natural resins; polyethylene glycol, sorbitan, and other polyvalent alcohol compounds; polyethylene glycol alkyl ether, polyethylene glycol alkyl phenyl ether, polyethylene glycol nonyl phenyl ether, polyoxyethylene lanolin alcohol ether, polypropylene glycol polyethylene glycol ether, and other ether compounds; and polyethylene glycol aliphatic acid ester, polyethylene glycol sorbitan aliphatic acid ester, polyoxyethylene lanolin aliphatic acid ester, and other ester compounds, preferably aliphatic acid ester compounds. We found that these low-melting compounds simultaneously perform three functions; i.e., the function of a dye solvent, the function of a sensitizer, and the function of a binder (binding agent), in addition to their excellent solubility in the organic solvent used in dissolving the dye. We consider that a part of the effects of the present invention depends on these combined functions of the low-melting compounds.

As stated hereinbefore, in the practice of this invention, the above-mentioned low-melting compounds may be used alone or in combination, the latter in order to adjust the melting point, viscosity, or other like properties of the resulting ink composition. In both cases, it is preferred that the low-melting compounds be used in an amount of 5% to 95% by weight, preferably 40% to 90% by weight, based on the total amount of the ink composition. The amount of the low-melting compounds may be varied within the above-described range depending upon such factors as the specific dye to be used with the ink composition, conditions of the transfer recording, and desired results.

In the preparation of ink compositions of the present invention, it is also essential to use, as a filling agent, inorganic or organic fine powders that are insoluble and dispersible in organic solvents. These powders, as briefly stated hereinbefore, can act as a barrier to the expression or migration of the transfer component during transfer recording. The fine powders are very useful in the practice of this invention, since they enable the ink sheet to be repeatedly used by reducing the amount of the transfer component expressed or migrated in each transfer recording step.

Preferred inorganic or organic fine powders effectively used for the present invention include fine powders of zinc oxide, tin oxide, aluminum oxide, and other metal oxides; fine powders (alternatively, in the form of metal foil) of aluminum, copper, cobalt, and other metals; fine powders of diatomaceous earth, a molecular sieve, phenol resin, epoxy resin, and other organic compounds; and fine powder of carbon black. Alternatively, two or more of said fine powders may be used in combination. Among these fine powders, carbon black is the most preferred since it has a remarkably high agglomeration property. Carbon black is generally used as a black pigment, but in the present invention it functions not as a pigment but as a medium for gradually expressing the ink composition from the ink sheet after the viscosity of the composition is lowered through the heating of the sheet. The carbon black is not transferred to the receiver sheet together with the ink composition, but remains on the ink sheet.

The above-described fine powders preferably have a particle size of 0.01 to 200 μm. If the particle size is less than 0.01 μm, the fine powders will not act as a barrier. On the other hand, if the particle size of the fine powders exceeds 200 μm, an ink composition of a low quality will result and the larger particle size will result in lesser printing quality.

Furthermore, the above-described fine powders preferably are used in an amount of 10% to 80% by weight, preferably 30% to 60% by weight, based on the total amount of the ink composition. The amount of the fine powders may be selected based on the conditions of the transfer recording, desired results, and other factors, as in the case of the above-described low-melting compounds.

Although the precise mechanism behind the effect of the above-discussed fine powders in the ink compositions of the present invention is not yet completely understood, it is believed that the fine powders modify the ink composition layer on the ink sheet to a porous spongy structure which enables only a small amount of the tranfer component of the ink composition to be consumed at each transfer recording step. The skeleton of the spongy structure can act as the barrier described above.

The above-described components forming the ink composition, namely, the solvent dye, the low-melting compounds (aid), and the inorganic or organic fine powders (filling agent), are uniformly blended together with a suitable organic solvent to prepare an ink composition solution. The resulting solution is then coated on the above-described substrate by means of a roll coater, bar coater, doctor blade, or other conventional coating device, thereby producing the heat transfer recording ink sheet of the present invention.

The ink composition layer is preferably formed onto the substrate so as to have a dry thickness of 10 to 50 μm. When the thickness is less than 10 μm, the ink sheet shows a remarkably decreased capability for repeated use. On the other hand, when the thickness is more than 50 μm, it is difficult to attain a satisfactory heat transfer effect under conventional heating conditions such as by the use of a thermal printing head. Further, the unsatisfactory heat transfer effect would result in a recognizable decrease of the density of the printed records.

In one preferred embodiment of the present invention, it is advantageous that the surface of the ink composition layer of the ink sheet produced in the above-described manner be subjected to a smoothing treatment. The smoothing treatment can be carried out, for example, by running the ink sheet between a pair of pressure rollers under application of a linear pressure of 5 to 20 kg/cm. Such a smoothing treatment not only results in a smoothed surface of the ink composition layer, but also, unexpectedly, a more intimate and uniform distribution of the inorganic or organic fine powders in the ink composition layer, thereby achieving a notable increase in printing quality.

The following examples further illustrate this invention. The term "overall dot printing" as frequently used in the examples means that dot printing is entirely or wholly carried out in the predetermined printing area by means of a thermal head.

EXAMPLE 1

Three (3) g of azo black dye commercially available under the tradename "KST Black KR" from Nippon Kayaku Co., Ltd., 5 g of polyethylene glycol commercially available under the tradename "#4000" from Nippon Oils & Fats Co., Ltd., and 5 g of carbon black powder commercially available under the tradename "Continex" from Toyo Continental Carbon Co., Ltd. were dissolved (or, alternatively, dispersed) in a mixed organic solvent of 5 ml of isopropyl alcohol and 5 ml of toluene. The resulting ink composition solution was then coated on condenser paper having a thickness of 16 μm for a dry thickness of about 25 μm by means of a bar coater, then dried thoroughly, thereby producing the heat-transfer-recording ink sheet. The ink sheet was used for repeated overall dot printing in a facsimile device (functions: 0.4 W/dot, 4 m sec). The ink sheet obtained in this example was able to be reused for a total seven overall dot printing processes. The optical reflection density of the printed records produced in each printing process was determined by a conventional testing method. The results are shown in Table 1.

TABLE 1

| Overall dot printing | 1st | 2nd | 3rd | 4th | 5th | 6th | 7th |
|---|---|---|---|---|---|---|---|
| Optical reflection density | 0.8 | 0.7 | 0.7 | 0.7 | 0.6 | 0.6 | 0.5 |

EXAMPLE 2

(Comparative)

The procedure of example 1 was repeated, except that polyethylene glycol and carbon black powder were omitted from the ink composition solution. The results are shown in Table 2.

TABLE 2

| Overall dot printing | 1st | 2nd | 3rd |
|---|---|---|---|
| Optical reflection density | 1.2 | 0.1 | 0 |

The above results indicate that the resultant ink sheet could be effectively used only for the first overall dot printing process.

EXAMPLE 3

Three (3) g of azo black dye ("KST Black KR", cited above), 5 g of polyethylene glycol ("#4000", cited above), and 8 g of zinc oxide powder (particle size 0.04 μm) were dispersed in a mixed organic solvent of 7 ml of isopropyl alcohol and 7 ml of toluene, then thoroughly mixed for 8 hours with a ball mill. The resultant ink composition solution was coated on condenser paper having a thickness of 16 μm for a dry thickness of about 25 μm by using a bar coater, then dried sufficiently, thereby producing the heat transfer recording ink sheet. This was then used for repeated overall dot printing as in example 1. The ink sheet obtained in this example could be reused for a total of seven overall dot printing processes.

The optical reflection density of the printed records produced in each printing process was determined as in example 1. The results are shown in Table 3.

TABLE 3

| Overall dot printing | 1st | 2nd | 3rd | 4th | 5th | 6th | 7th |
|---|---|---|---|---|---|---|---|
| Optical reflection density | 0.8 | 0.7 | 0.6 | 0.6 | 0.5 | 0.5 | 0.4 |

EXAMPLE 4

Two (2) g of blue dye commercially available under the tradename "KST Blue 136" from Nippon Kayaku Co., Ltd., 1 g of polyethylene.glycol alkyl phenyl ether commercially available under the tradename "Emulsit" from Dai-ichi Kogyo Seiyaku Co., Ltd., and 2 g of carbon black powder ("Continex", cited above) were dissolved (or, alternatively, dispersed) in 5 ml of toluene and thoroughly mixed to form an ink composition solution. The resultant ink composition solution was then coated on polyimide film having a thickness of 12 μm for a dry thickness of about 25 μm by using a bar coater, then thoroughly dried, thereby producing the heat transfer recording ink sheet. The resultant ink sheet was then used for repeated overall dot printing as in example 1. The ink sheet obtained in this example could be reused for a total of four overall dot printing processes.

The optical reflection density of the printed records produced in each printing process was determined as in example 1. The results are shown in Table 4.

TABLE 4

| Overall dot printing | 1st | 2nd | 3rd | 4th |
|---|---|---|---|---|
| Optical reflection density | 0.6 | 0.5 | 0.5 | 0.4 |

EXAMPLE 4

(Comparative)

The procedure of example 4 was repeated, except that carbon black powder was omitted from the ink composition solution. The results ae shown in Table 5.

TABLE 5

| Overall dot printing | 1st | 2nd | 3rd |
|---|---|---|---|
| Optical reflection density | 0.7 | 0.3 | 0.1 |

The above results indicate that the resultant ink sheet could be used only for the first overall dot printing process.

EXAMPLE 6

The procedure of example 3 was repeated, except that the following mixture of the low-melting compounds was used in place of just polyethylene glycol ("#4000", cited above):

| | |
|---|---|
| Polyethylene glycol ("#4000") and | 3 g |
| Sorbitan aliphatic acid ester | 2 g |
| ("Sorgen" commercially available from Dai-ichi Kogyo Seiyaku Co., Ltd.) | |

The resultant ink sheet was tested as in Example 3. Good results similar to those of Example 3 were obtained. The results are shown in Table 6.

TABLE 6

| Overall dot printing | 1st | 2nd | 3rd | 4th | 5th | 6th | 7th |
|---|---|---|---|---|---|---|---|
| Optical reflection density | 0.7 | 0.7 | 0.6 | 0.6 | 0.6 | 0.5 | 0.4 |

EXAMPLE 7

The procedure of example 1 was repeated, except that a natural resin was used as a low-melting compound and acetone was used as an organic solvent. The natural resin used herein is a mixture of 3 g of carnauba wax (product of Kanto Kagaku Kabushiki Kaisha) and 2 g of rosin (commercially available under the tradename "Super ester S-80" from Arakawa Kagaku Kogyo Kabushiki Kaisha).

The resultant ink sheet was tested as in example 1. Good results similar to those of example 1 were obtained. The results are shown in Table 7.

TABLE 7

| Overall dot printing | 1st | 2nd | 3rd | 4th | 5th | 6th | 7th |
|---|---|---|---|---|---|---|---|
| Optical reflection density | 0.8 | 0.7 | 0.7 | 0.6 | 0.6 | 0.5 | 0.5 |

EXAMPLE 8

Smoothing treatment

A heat transfer recording ink sheet was produced according to the procedure described in example 6. The resultant ink sheet was then run between a pair of pressure metal rollers under application of a linear pressure of 10 kg/cm to subject it to a smoothing treatment.

As a result of this treatment, a glossy surface was produced on the ink composition layer. A remarkable increase of the smoothness of the surface was observed. Further, it was also observed that the thickness of the ink composition layer was lowered from 25 μm to 20 μm and that the density of the zinc oxide powder dispersed therein was increased.

The treated ink sheet was used for repeated overall dot printing as in example 6. The results showed that the uneven print density slightly observed in example 6 was completely avoided and that the resulting print quality was excellent, better than that of example 6.

The optical reflection density of the printed records produced in each printing process was determined as in example 6. The results are shown in Table 8.

TABLE 8

| Overall dot printing | 1st | 2nd | 3rd | 4th | 5th | 6th | 7th |
|---|---|---|---|---|---|---|---|
| Optical | 0.9 | 0.8 | 0.8 | 0.7 | 0.7 | 0.7 | 0.6 |

TABLE 8-continued

| Overall dot printing | 1st | 2nd | 3rd | 4th | 5th | 6th | 7th |
|---|---|---|---|---|---|---|---|
| reflection density | | | | | | | |

We claim:

1. A heat transfer recording ink sheet which comprises a substrate having formed thereon a layer of ink composition, said ink composition consisting of:

a transfer component of a solvent dye and at least one low-melting compound having a melting point in the range from 40° to 100° C. and containing at least one of hydroxyl and ethylene oxide; and at least one inorganic or organic fine powder having a particle size in the range from 0.01 to 200 μm, each said fine powder being insoluble and dispersible in an organic solvent.

2. An ink sheet as in claim 1, in which the solvent dye is an anthraquinone dye, azo dye, direct dye, acid dye, or basic dye.

3. An ink sheet in claim 1, in which each said low-melting compound is a natural resin, a polyvalent alcohol compound, an ether compound, or an ester compound.

4. An ink sheet as in claim 1, in which each said fine powder is of a metal oxide, a metal, an organic compound, or carbon black.

5. An ink sheet as in claim 1, in which the ink composition layer has a thickness in the range from 10 to 50 μm.

6. An ink sheet as inclaim 1, in which a surface of the ink composition layer is subjected to a smoothing treatment under application of a linear pressure of 5 to 20 kg/cm.

7. The ink sheet of claim 1 wherein space between particles of said fine powder is filled by said transfer component, and said transfer component is capable of moving through said space between said particles of said fine powder when said low-melting compound is melted.

8. The ink sheet of claim 7, wherein said fine powder is in the range of from 10 to 80% of the total weight of the ink composition.

9. The ink sheet of claim 8, said fine powder being in the range from 30 to 60% of the total weight of the ink composition.

10. The ink sheet of claim 7, wherein said low-melting compound is in the range from 5 to 95% o the total weight of the ink composition.

11. The ink sheet of claim 10, wherein said low-melting compound is in the range from 40 to 90% of the total weight of said ink composition.

12. The ink sheet of claim 1, wherein said dye is dissolved in said low-melting compound.

13. The ink sheet of claim 8, wherein said low-melting compound is at least 5% of the total weight of said ink composition.

* * * * *

UNITED STATES PATENT AND TRADEMARK OFFICE

CERTIFICATE OF CORRECTION

PATENT NO. : 4,661,393

DATED : April 28, 1987

INVENTOR(S) : Koji Uchiyama, Akira Nakazawa, Masao Tanaka

It is certified that error appears in the above-identified patent and that said Letters Patent is hereby corrected as shown below:

Front Page, column 2, "OTHER PUBLICATIONS"

line 1, "bulletin" should be --Bulletin--;

line 4, "bulletin" should be --Bulletin--.

Columm 1, line 22, "intense" should be --instance--;

line 57, after "retain" insert --ink--;

line 67, "process,s" should be --process,--.

Column 3, line 27, "meta" should be --metal--;

line 31, "rage" should be --range--;

line 44, "a" should be --as--.

Column 6, line 26, "m sec)." should be --msec).--;

line 27, after "total" insert --of--.

Column 9, line 24, "in claim" should be --as in claim--.

UNITED STATES PATENT AND TRADEMARK OFFICE
CERTIFICATE OF CORRECTION

PATENT NO. : 4,661,393 Page 2 of 2

DATED : April 28, 1987

INVENTOR(S) : Koji Uchiyama, Akira Nakazawa, Masao Tanaka

It is certified that error appears in the above-identified patent and that said Letters Patent is hereby corrected as shown below:

Column 10, line 4, "inclaim" should be -- in claim --;
line 21, "o the" should be --of the--.

Signed and Sealed this

Sixth Day of October, 1987

*Attest:*

DONALD J. QUIGG

*Attesting Officer*

*Commissioner of Patents and Trademarks*